US006987734B2

(12) United States Patent
Hundemer

(10) Patent No.: US 6,987,734 B2
(45) Date of Patent: Jan. 17, 2006

(54) PROVISION OF DIGITAL DATA VIA MULTIPLE BROADCASTS

(75) Inventor: Hank Hundemer, Bellevue, KY (US)

(73) Assignee: Clear Channel Wireless, Inc., Cincinnati, OH (US)

( * ) Notice: Subject to any disclaimer, the term of this patent is extended or adjusted under 35 U.S.C. 154(b) by 815 days.

(21) Appl. No.: 09/838,781

(22) Filed: Apr. 20, 2001

(65) Prior Publication Data

US 2002/0154623 A1 Oct. 24, 2002

(51) Int. Cl.
*H04J 1/16* (2006.01)

(52) U.S. Cl. ....................... 370/237; 370/352; 709/239; 455/453

(58) Field of Classification Search ................. 370/230, 370/235, 237, 238, 351, 352, 389, 395.5, 370/395.52, 401, 428, 465, 486; 709/238, 709/232, 239; 455/427; 725/109
See application file for complete search history.

(56) References Cited

U.S. PATENT DOCUMENTS

| | | | | |
|---|---|---|---|---|
| 5,347,304 | A | 9/1994 | Moura et al. | 348/12 |
| 5,414,773 | A | 5/1995 | Handelman | 380/49 |
| 5,534,913 | A | 7/1996 | Majeti et al. | 348/7 |
| 5,586,121 | A | 12/1996 | Moura et al. | 370/404 |
| 5,663,757 | A | 9/1997 | Morales | 348/13 |
| 5,666,487 | A | 9/1997 | Goodman et al. | 395/200.76 |
| 5,675,732 | A | 10/1997 | Majeti et al. | 395/200.01 |
| 5,706,048 | A | 1/1998 | Davis | 348/12 |
| 5,729,549 | A | 3/1998 | Kostreski et al. | |

(Continued)

OTHER PUBLICATIONS

Gordon Bell and Jim Gemmel, "On–ramp Prospects for the Information Superhighway Dream", Jul. 1996.

Dennis Fowler, Mixed Media: "The Wireless Net", Jul.–Aug. 1997.

Dennis Fowler, NetNews: "Satellites: The New Bandwidth–Busters?", Dec. 1998.

John Yum, "Skystream Networks—Turbo Internet Case Study", Jul. 2001.

Donald F. Robertson, "Tweaking", Feb. 2001.

Copy of PCT International Search Report dated Jul. 3, 2002.

*Primary Examiner*—Frank Duong

(57) ABSTRACT

Internet access is provided through bandwidth available in broadcasted digital television signals, such as the digital television signals produced by terrestrial broadcast towers. Bandwidth is dynamically allocated or provisioned among clients, and is managed in part by the clients, thus providing dynamic, distributed management of spectrum allocation. Automatic provisioning may be applied among different terrestrial transmission towers, or different satellites, among transponders or channels on a given tower, or a given satellite, or among other forms of multiple broadcast origination points. The provisioning dynamically and automatically equalizes load among those multiple broadcast points. Principles of the present invention may also be applied to automatic provisioning of digital content among non-television broadcast sources, such as cellular telephone towers having available bandwidth, analog or digital radio broadcasts having available bandwidth, or satellite broadcast facilities, and/or dedicated broadcast towers or satellites operating in an allocated spectrum and limited to broadcasting requested digital content. In a satellite embodiment, provisioning may occur among multiple satellites as well as between transponders or time- or frequency-multiplexed channels provided by a single satellite.

24 Claims, 11 Drawing Sheets

U.S. PATENT DOCUMENTS

| | | | | | |
|---|---|---|---|---|---|
| 5,761,606 | A | | 6/1998 | Wolzien | 455/6.2 |
| 5,794,116 | A | | 8/1998 | Matsuda et al. | |
| 5,818,935 | A | | 10/1998 | Maa | 380/20 |
| 5,828,403 | A | | 10/1998 | DeRodeff et al. | 348/7 |
| 5,852,437 | A | | 12/1998 | Wugofski et al. | 345/327 |
| 5,923,379 | A | | 7/1999 | Patterson | 348/565 |
| 5,961,603 | A | * | 10/1999 | Kunkel et al. | 709/229 |
| 5,987,518 | A | | 11/1999 | Gotwald | 709/230 |
| 5,991,800 | A | | 11/1999 | Burke et al. | 709/218 |
| 5,995,155 | A | | 11/1999 | Schindler et al. | 348/461 |
| 5,995,726 | A | | 11/1999 | Dillon | |
| 6,006,256 | A | | 12/1999 | Zdepski et al. | 709/217 |
| 6,016,388 | A | | 1/2000 | Dillon | 395/200.72 |
| 6,046,980 | A | * | 4/2000 | Packer | 370/230 |
| 6,049,539 | A | | 4/2000 | Lee et al. | 370/355 |
| 6,058,422 | A | | 5/2000 | Ayanoglu et al. | |
| 6,061,719 | A | | 5/2000 | Bendinelli et al. | 709/218 |
| 6,115,750 | A | | 9/2000 | Dillon et al. | 709/235 |
| 6,118,472 | A | * | 9/2000 | Dureau et al. | 725/109 |
| 6,130,898 | A | | 10/2000 | Kostreski et al. | 370/522 |
| 6,141,333 | A | | 10/2000 | Chavez, Jr. | 370/338 |
| 6,144,998 | A | | 11/2000 | Pisterzi | 709/219 |
| 6,199,206 | B1 | | 3/2001 | Nishioka et al. | 725/51 |
| 6,205,473 | B1 | * | 3/2001 | Thomasson et al. | 709/217 |
| 6,223,222 | B1 | | 4/2001 | Fijolek et al. | 709/227 |
| 6,263,503 | B1 | | 7/2001 | Margulis | 725/81 |
| 6,266,339 | B1 | | 7/2001 | Donahue et al. | 370/432 |
| 6,271,837 | B1 | | 8/2001 | Naiff | 345/327 |
| 6,272,681 | B1 | | 8/2001 | Henderson | 725/126 |
| 6,275,989 | B1 | | 8/2001 | Broadwin et al. | 725/37 |
| 6,434,562 | B1 | * | 8/2002 | Pennywitt et al. | 707/10 |
| 6,532,495 | B1 | * | 3/2003 | Welles et al. | 709/232 |
| 6,810,413 | B1 | * | 10/2004 | Rajakarunanayake et al. | 709/203 |

* cited by examiner

REGION TABLE (RT)

| REGION ID | VPN IP | ROUTER IP | SUPPORT SERVER IP |
|---|---|---|---|
| | | | |
| | | | |
| | | | |

FIG. 3A

REGION PARTICIPANT TABLE (RPT)

| AFFILIATE ID | AFFILIATE CALL LETTERS | AFFILIATE CHANNEL NO. | CHANNEL PID | REGION ID | ENCAPSULATOR IP ADDRESS |
|---|---|---|---|---|---|
| | | | | | |
| | | | | | |
| | | | | | |

FIG. 3B

CLIENT CHANNEL VIABILITY TABLE (CCVT)

| CHANNEL NO. | SIGNAL STRENGTH | ERROR RATE | USABLE? | CHANNEL PID | VPN IP ADDRESS |
|---|---|---|---|---|---|
| | | | | | |
| | | | | | |
| | | | | | |

FIG. 3C

AFFILIATE PROBLEM TABLE (APT)

| AFFILIATE ID | PROBLEM 1 DATE/TIME | PROBLEM 2 DATE/TIME | STATUS I/O | CUMULATIVE OFFENSES |
|---|---|---|---|---|
| | | | | |
| | | | | |
| | | | | |

FIG. 3D

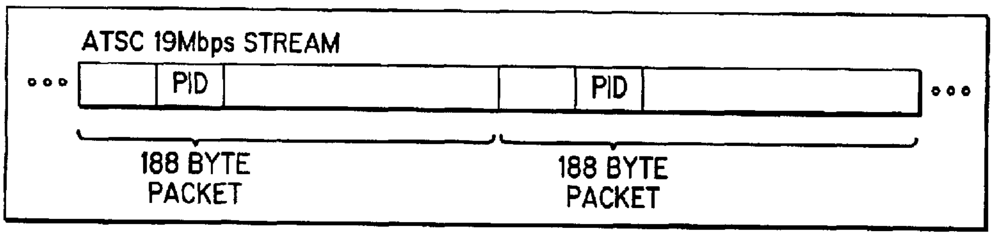

FIG. 4A

PROVISION OF DIGITAL DATA VIA MULTIPLE BROADCASTS

FIELD OF THE INVENTION

The present invention relates to broadcast of digital content, such as Internet accessible content, via wireless connections.

BACKGROUND OF THE INVENTION

In the decade that has recently passed, technologies for digital storage and transmission of data have revolutionized the national economy. Business and private homes are now increasingly connected to the Internet and other elements of the information infrastructure, using these connections for commerce, communication and leisure.

Initially, a large number of businesses and consumers obtained access to the Internet through dial-up connections through the telephone network, to an Internet service provider. Unfortunately, the communication speed of such a connection is currently limited to less than 56 kilobits per second (kbps). As applications of digital communication technologies have emerged, businesses and consumers have desired connections providing ever-greater communication speeds. In response to the resulting demand, high speed access technologies have been introduced, including digital subscriber line (DSL) services available through telephone utilities, digital cable services available through cable television companies, and digital satellite services using a digital satellite television network to deliver Internet content in response to requests from subscribers received over a standard telephone line connection.

While these high speed access technologies have been well received, each is available only to a limited number of customers. Particularly, DSL services are available only to those businesses and consumers in areas where telephone systems have been upgraded for digital operation. Digital cable service is available only to areas serviced by a cable television company that has made a similar investment in digital cable equipment. Digital satellite systems are theoretically available to every customer within the footprint of the transponders of the satellite; however, the satellite itself is a limited resource and thus can only service a limited number of subscribers.

There exists a need, therefore, for a methodology providing high speed access to digital content, that is available on a broad basis, particularly to those businesses and consumers that are not adequately serviced by existing technologies, such as businesses and consumers in rural areas.

SUMMARY OF THE INVENTION

Recently, the Advanced Television Standards Committee established standards for terrestrial digital transmission of television signals in the United States. Concurrently, Congress passed implementing legislation to allocate spectrum to existing holders of licenses from the Federal Communications Commission so that those licensees could commence digital television broadcasts of standard definition and ultimately high definition signals as the desired content evolves.

Unfortunately, at the present time, the vast majority of television content available to broadcasters is available only in standard definition, i.e., approximately 500 interlaced lines of resolution. Only a small amount of content available to broadcasters is in high definition format, i.e., 1000 interlaced or 500 progressive lines. As a consequence, the approximately 19 Mbps bandwidth signal produced on digital broadcast frequencies contains only about 12 Mbps of television signals, with the remaining bandwidth being consumed with "null packets" containing no television information.

As an inspiration of the present invention, it has been recognized that television broadcast transmitters are relatively ubiquitous within the United States, with most homes able to receive at least one and often several broadcasts. Furthermore, television broadcasts are not physically restrained by wiring; signals travel wirelessly in the RF spectrum. As a result, it has been recognized that the unused spectrum available to digital television broadcasters, can be a relatively wide bandwidth, nearly universally available path through which digital information may be delivered to consumers, providing a substitute or supplement to existing high speed digital access portals such as digital telephone or digital cable services.

Accordingly, one embodiment of the present invention relates to a method of providing Internet access through bandwidth available in broadcasted digital television signals such as the digital television signals produced by terrestrial broadcast towers.

One challenge in providing digital content through television broadcasts, is the need to dynamically allocate or provision the use of bandwidth among the customer base as the affiliated broadcasters change their use of bandwidth. For example, the broadcaster may initiate high definition programming, at which time the bandwidth available for Internet access is reduced and customers should be re-provisioned to other broadcasters, as possible. A similar issue is raised in the known provision of Internet access using digital satellite television broadcasts, in which case the overall bandwidth consumed at the satellite may change over time, and/or the bandwidth consumed at a given transponder at a satellite may change.

In accordance with another aspect of the present invention, principles of the present invention facilitate automatic provisioning of client usage among multiple broadcast origination points, such as among different terrestrial transmission towers or satellites, among transponders or channels on a given tower or satellite, or among other forms of multiple broadcast origination points. The provisioning dynamically and automatically equalizes load among those multiple broadcast points. In the specific embodiment that is disclosed, this provisioning is managed in part by the clients, thus providing dynamic, distributed management of spectrum allocation.

As noted, while the invention is described in the context of providing digital content via a plurality of terrestrial broadcast stations that are simultaneously transmitting digital television signals within allocated spectra for such signals, principles of this invention do not limit its application to use in conjunction with terrestrial television broadcast signals. For example, principles of the present invention may be applied to automatic provisioning of digital content among other terrestrial broadcast sources, such as cellular telephone towers having available bandwidth, analog or digital radio broadcasts having available bandwidth, satellite broadcast facilities such as the satellites operated by Hughes and currently used for its DirecTV and DirecPC services, and/or dedicated broadcast towers or satellites operating in an allocated spectrum and limited to broadcasting requested digital content.

It will be noted that satellite broadcasts typically utilize a multitude of transponders, oriented to serve different geographic areas, providing digital television or other digital signals in a frequency- and time-multiplexed manner; in applications of the principles of the present invention to such technology, the provisioning may occur among multiple satellites as well as between transponders or time- or frequency-multiplexed channels provided by a single satellite.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

FIGS. 3A and 3B are illustrations of tables maintained at the central control system 19 of FIG. 2 relating to geographic regions and affiliates in those geographic regions;

FIGS. 3C and 3D are illustrations of affiliate information maintained at client 10 of FIG. 2 relating to reception quality obtained from each of several affiliates;

FIG. 4A is an illustration of the format of the ATSC-compliant 19 Mbps packet stream broadcast by an affiliate;

DETAILED DESCRIPTION OF SPECIFIC EMBODIMENTS

Turning to the Drawings, wherein like numbers denote like parts throughout the several views, a configuration in accordance with principles of the present invention can be explained.

Figure 1:
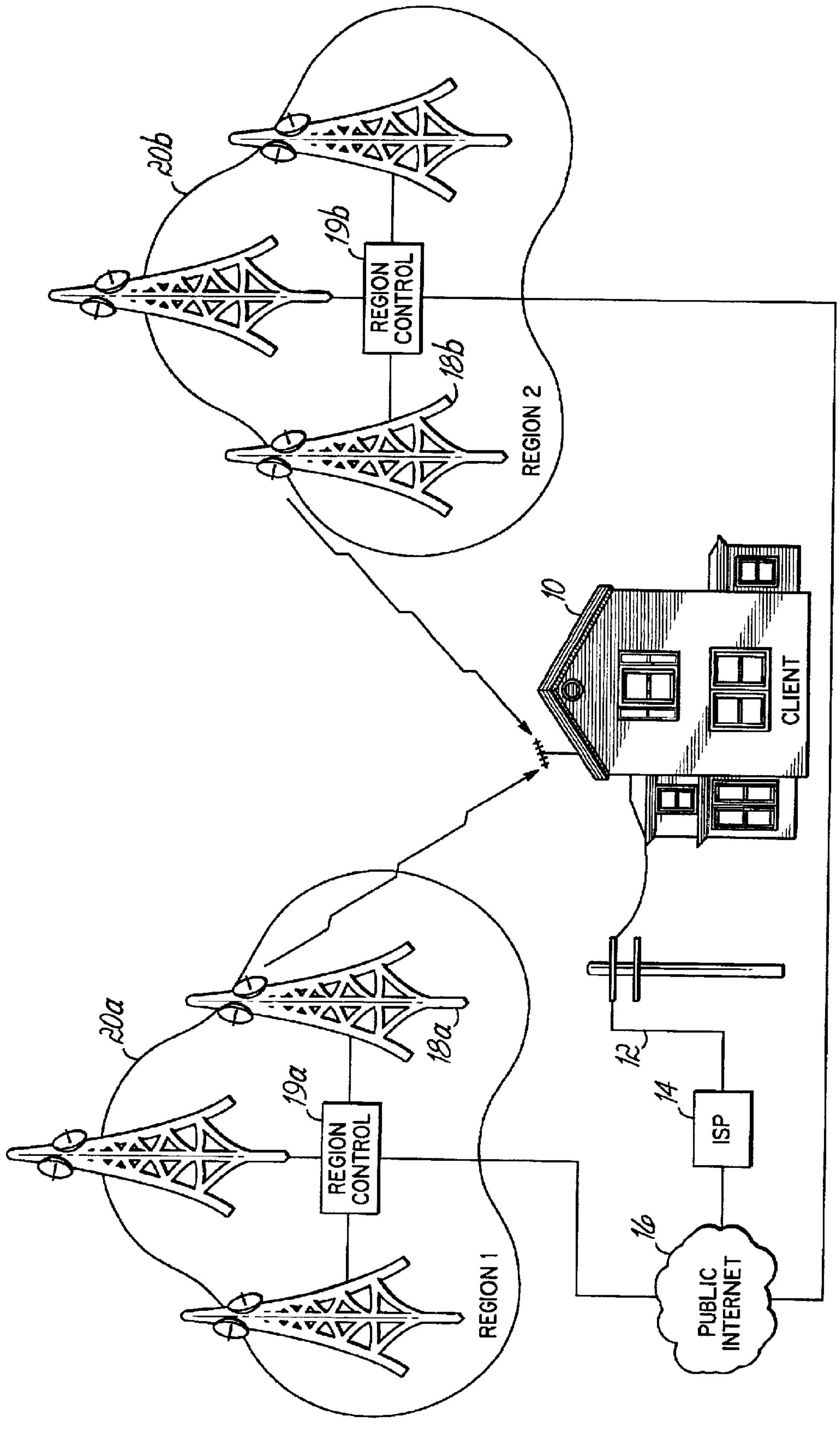
FIG. 1 illustrates the geographic positions of a client 10 and a plurality of broadcast towers from which the client may obtain Internet access, as well as the telephone and wireless connections that are established in accordance with principles of the present invention.

Referring to FIG. 1, a typical arrangement of components in providing wireless Internet access can be explained. In the case illustrated in FIG. 1, a client for the service 10 is located at a private residence or business location unable to obtain high speed Internet access via cable or telephone connections. Client premises 10 is accessible to the Internet only through telephone dial-up connections via telephone lines 12 to an Internet service provider 14 and from there to the public Internet 16.

Client 10, in accordance with the principles of the present invention, obtains Internet access from digital broadcast signals originated by remote transmitters, such as digital television transmitters 18*a* and 18*b*. It can be seen in FIG. 1, that in accordance with the principles of the present invention, transmit towers are grouped into regions such as region 1 20*a* and region 2 20*b*. Within each region is a region control center 19*a* or 19*b* respectively, controlling the delivery of digital data to clients via transmission towers within that region. As can be seen, typically a plurality of transmission towers are included in each region, and are connected to a region control center 19 via high speed wireless or wired digital data connections. Each regional control center 19 is coupled via a high speed connection to the public Internet 16 whereby regional control center 19 may obtain Internet content for transmission to clients such as 10, and interact with clients such as 10 to facilitate delivery of digital data content.

Figure 2:
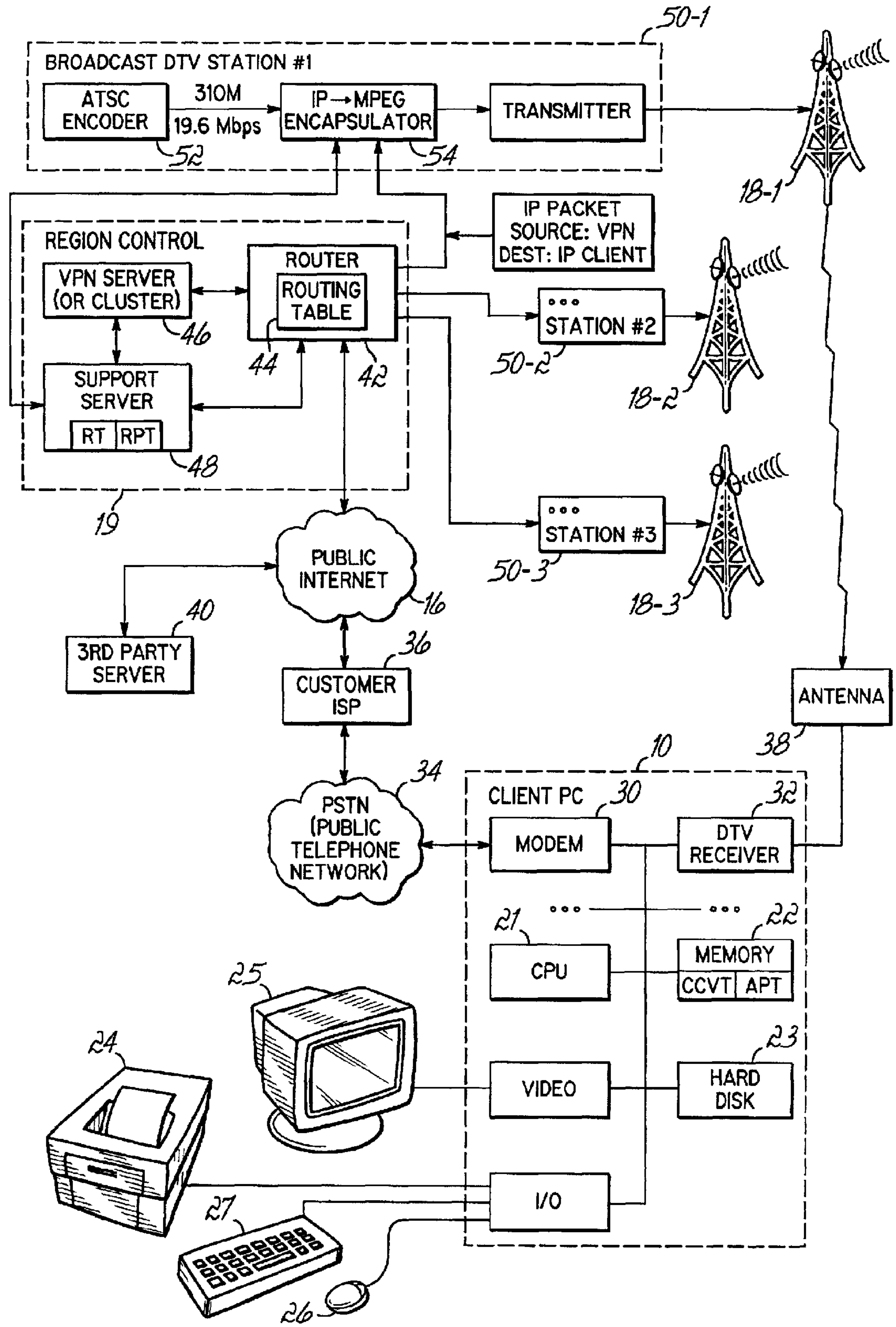
FIG. 2 illustrates a configuration in accordance with principles of the present invention, of a client personal computer connected to the telephone network, Internet network, central control system 19 and digital television broadcast stations at a number of digital broadcast origination points.

Referring to FIG. 2, details can be seen in the structures at regional control centers 19 and client 10, as well as broadcast systems used by transmitters 18 within a region. At the premises of client 10 is a personal computer system or another computer system used by the client to access Internet content. Computer system 10 is illustrated as a stand-alone personal computer (PC), but may also be configured as a networked computer system including one or more client computers (e.g., desktop or PC-based computers, workstations, etc.) coupled together as a peer network using, e.g., Windows networking, and/or client computers and a server (e.g., a PC-based server, a minicomputer, a midrange computer, a mainframe computer, etc.), connected through a network.

Computer 10 operates under the control of an operating system, and executes various computer software applications, components, programs, objects, modules, etc. (e.g., networking software, an Internet protocol stack, the software described below, among others). Moreover, various applications, components, programs, objects, modules, etc. may also execute on one or more processors in another computer coupled to computer 10 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs," or simply "programs." The computer programs typically comprise one or more instructions that are resident at various times in various computer memory and storage devices. When a program is read and executed by a processor, the program causes the computer to execute steps or elements embodying the various aspects of the invention.

Moreover, while the invention has and hereinafter will be described in the context of fully functioning computers and computer systems, those skilled in the art will appreciate that the various aspects and embodiments of the invention are performed via software and are capable of being distributed as a program product in a variety of forms. Further, the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission-type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary configuration illustrated in FIG. 1 is not intended to limit the present invention. Indeed, those skilled in the art will recognize that other alternative hardware and/or software configurations may be used without departing from the scope of the invention.

In the embodiment illustrated in FIG. 1, computer 10 may include: a central processing unit (CPU) 21, a number of peripheral components such as a computer display 25 interfaced via a video card, a storage device such as a hard disk 23, memory 22, and various devices connected via input/output connections, such as a printer 24, input devices, and others.

Computer 10 typically includes at least one processor 21, but processor 21 may represent one or more processors (e.g., microprocessors).

Memory 22 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 22 may be considered to include memory storage physically located elsewhere in computer 10, e.g., any cache memory in processor 21, as well as any storage capacity used as a virtual memory. Data of particular interest that may be stored in memory 22 in accordance with the principles of the present invention, are a client channel viability table (CCVT) and an affiliate problem table (APT), each of which will be discussed below.

For interface with a user, computer 10 typically includes one or more input devices (e.g., keyboard 27, pointing device such as mouse 26, a trackball, a joystick, a touchpad, and/or a microphone, among others) and a display 25 (e.g., a CRT monitor, an LCD display panel, and/or a speaker, among others). It should be appreciated, however, that with some implementations of computers used in accordance with principles of the present invention, e.g., some server implementations, direct user input and output may not be supported by the computer, and interface with the computer may be implemented through a client computer or workstation networked with computer 30.

For additional storage, computer 10 may also include one or more mass storage devices 23. Exemplary storage devices 23 can include: a floppy or other removable disk drive, a hard disk drive, a direct access storage device (DASD), an optical drive (e.g., a CD drive, a DVD drive, etc.), and/or a tape drive, among others.

Furthermore, in a networked environment, computer 10 may include network interfacing equipment with one or more networks (e.g., a LAN, a WAN, a wireless network, and/or the Internet, among others) to permit the communication of information with other computers coupled to the network. It should be appreciated that computer 10 typically includes suitable analog and/or digital interfaces between processor 21 and each of components coupled thereto.

For carrying out access to Internet content in accordance with principles of the present invention, computer 10 includes a modem 30, which is illustrated as an internal modem but may be an external modem or a shared modem available at a modem pool in a networked computer system.

Computer 10 further includes a digital television receiver card 32 for tuning digital television signals received from a suitable antenna 38 connected thereto. Digital television receiver card 32 is, again, illustrated as an internal card but may also be an external device or a device accessed via a computer network. Digital television receiver 32 may be an external television receiver with a high speed digital connection to CPU 21, or preferably may be an expansion card for use in a personal computer such as the Digital Television Tuner Expansion Card available as the TerraCast DTA-100, from Broadlogic, Inc., 638 Gibraltar Court, Milpitas, Calif. 95035.

When used to obtain Internet content, computer system 10 connects via a dial-up (POTS) telephone connection through the public telephone network 34 to a dial-up server 36 located at an Internet Service Provider (ISP), establishing a point-to-point connection for Internet traffic, as is conventionally used for Internet access by consumers. ISP server 36 provides access to the public Internet 16 via a router or other connection established and maintained by ISP server 36. Conventionally, a modem such as modem 30 is used in this manner for a bidirectional access to Internet content via the public telephone network and an Internet Service Provider (ISP). In accordance with the principles of the present invention, Internet content is also received via a digital television receiver (DTV) card 32 and incorporated into the personal computer at the client location. DTV receiver card 32 is used to receive digital television signals from one of the various television transmitters 18 that can be received at the premises of client 10.

As will be explored in further detail below, to access Internet content from a third-party server 40, CPU 21 delivers a request for this content via modem 30 in the public telephone network and ISP 36 through the public Internet to region control center 19. In region control center 19, the client's request is converted to a request directed to a third party server 40. When content is returned from third party server 40, region control center 19 then delivers the returned content to the broadcast digital television station currently being monitored by the client, so that the content will be transmitted back to the client for receipt by the client's digital television receiver 32.

As seen in FIG. 2, region control center 19 includes three main components. The first component is a router 42 coupled to the public Internet 16 via high speed connection. Router 42 routes Internet traffic to and from the public Internet 16 and other connected sources and destinations based upon a routing table 44 internal to router 42. Router 42 is of a configuration that is known throughout the public Internet 16, which is widely populated with routers that route packets in accordance with the Internet protocol (IP) based upon routing tables. The Internet protocol defines a process in which routing tables and routers are updated, using a dynamic routing protocol. The routers receive packets containing routing information, that are exchanged amongst routers and describe connections accessible at each router. As explored in detail below, routing information packets are used to update the routing table 44 in router 42 as to properly route Internet content to clients via digital television stations at a region. Various protocols may be used for this interaction, such as RIP, RIP2 or OSPF (open shortest path first). OSPF has the advantage that it may be used with a large number of clients.

Region control center 19 further includes a virtual private networking server 46 or a cluster of such servers which are used for establishing virtual private networks using Internet tunneling protocols, to client computer systems via the client's Internet server provider. Control information and identifications of content requested by a client, are delivered from the client to the regional control center, via the virtual private networking connection.

A third element at region control center 19 is a support server 48. Support server 48 includes control information and monitors and controls operation of other elements of the region control center. Support server includes databases used in management of client Internet connections including a region table (RT) and a region participate table (RPT) which are detailed in FIGS. 3A and 3B below.

Support server 48 and router 42 are connected directly via wireless or wired high speed digital data connections to each broadcast television station within the region being controlled by the region control center 19. Three such stations are illustrated in FIG. 2. Station 50-1 is detailed so that the major operating components of a DTV station can be seen. Stations 50-2 and 50-3 are illustrated in schematic form. Each station 50 delivers a 19 Mbps digital television signal via a transmitter to a transmission tower 18. This 19 Mbps digital signal incorporates digital television information in accordance with the Advanced Television Standards Committee (ATSC) formats. Further, this digital stream includes Internet content that has been selected and requested for delivery by clients in accordance with principles of the present invention.

As can be seen in the detail of station 50-1, each broadcast DTV station incorporates an ATSC encoder 52 for producing a digital television stream conforming, e.g., to standard 310M at 19 Mpbs. This digital television stream is delivered to a encapsulator 54, that has the purpose of encapsulating internet protocol information into moving picture expert group (MPEG) television information produced by ATSC encoders. Encapsulators that are suitable for use as encapsulator 54 are available from Skystream Networks of 455 DeGuigne Drive, Sunnyvale, Calif. 94085-3835. Further details on the operations performed by encapsulator 54 to encapsulate IP information into a MPEG stream will be discussed below with reference to FIG. 4A.

Referring now to FIG. 3A, details of the region table maintained by support server 48 can be explained. The region table includes information relating to the various regions that are available to clients in accordance with principles of the present invention. Each region is represented by an entry in region table of FIG. 3A; each entry includes the identifier for the region, the Internet protocol address for the virtual private networking server for that region, the IP address for the router for that region and the IP address for the support server for that region.

Referring now to FIG. 3B, the format of the region participant table can be explained. The region participant table provides information for broadcasters that are participating in the broadcast of Internet content in accordance with the principles of the present invention for each region. Each entry in this table represents one transmission site that participates in the broadcasting system of the present invention. Each entry identifies the affiliate broadcaster using an identifier, as well as using call letters such as are typically used on digital television stations or radio stations. Additionally, an affiliate channel number to be used by a digital television tuner is provided. A channel packet identifier (PID) is also provided which can be used to identify those packets delivered by the affiliate that contain Internet protocol information. The affiliate is also associated with the identifier for the region within which the affiliate participates. And finally, the table provides the Internet protocol address of the encapsulator used by the affiliate. The information in the region table and the region participate table are sufficient for the region control center to manage and communicate with each affiliate for a region.

Referring to FIG. 3C, the client channel viability table established by a client computer system can be explained. As is detailed below, the client channel viability table is assembled by the client computer system 10, to store all relevant information regarding channels that are potentially accessible to the client. Each entry in the client channel viability table is representative of a channel potentially receivable by the client. Within an entry, a channel is identified by a channel number. The table stores the signal strength of the channel during those periods when the channel is received, and the error rate, i.e., the number of uncorrectable packets received on the channel. Each channel is flagged as usable or not usable within the client channel viability table, in a manner that is discussed in further detail below. Each channel is also associated with the PID used by that channel in the encapsulated Internet protocol information. Finally, each channel is associated with the Internet protocol address of the virtual private networking server at the region control center to which the channel is connected. The client channel viability table is used in the manner described below to select and manage the selection of a particular channel through which to receive Internet protocol information. The usability of the currently tuned channel for this purpose is regularly assessed, and the information that is gathered is stored in an affiliate problem table.

Referring to FIG. 3D, the affiliate problem table includes an entry for each affiliate that is potentially receivable by a client. The affiliate is identified by the same affiliate ID used in the region participant table of FIG. 3B. In the affiliate problem table, fields are used to store the date and time when a problem was encountered receiving digital data from a channel. Two fields are provided to store date and time information for two encountered problems. As explored in detail below, channels are disqualified from use for Internet routing when more than two problems have been encountered in a short time period as is identified in the fields in the affiliate problem table. Based upon an analysis of this kind, a further field in the affiliate problem table is a status bit that may be set to 1 or 0 to indicate whether the affiliate is available for use. Finally, a last field in the affiliate problem table is used to identify the number of times that a transmission problem has occurred with the affiliate. This count is used for a long term evaluation of affiliates that have had reception problems. Use of the client channel viability table and affiliate problem table will be explored in greater detailed below in connection with FIGS. 5E and 5F.

Referring now to FIG. 4A, the format of the ATSC compatible 19 Mbps stream can be discussed. As seen in FIG. 4A, the transmitted stream of data comprises a sequence of 188 byte packets, each of which incorporates a header and a payload of data. The header for each packet includes a packet identifier PID field that identifies the type of packet that is being transmitted. Notably, in a typical ATSC compatible transmission the transmitted packets predominantly include video and audio data packets and null packets that do not deliver any data. The ATSC compatible receiver evaluates each packet as received and, based upon the PID incorporated into the packet, determines the type of data and how it is to be delivered and/or processed. As noted above, transmissions of digital content to clients that has, e.g., been retrieved from an Internet source, is associated with a PID that is currently not used in ATSC compliant data transmissions. This PID is recognized by the ATSC compatible receiver, which in turn delivers the data content in the packet to the software described below which determines whether the data content is intended for client computer 10 and, if so, de-encrypts the data and returns it to the requesting application.

Figure 4B:
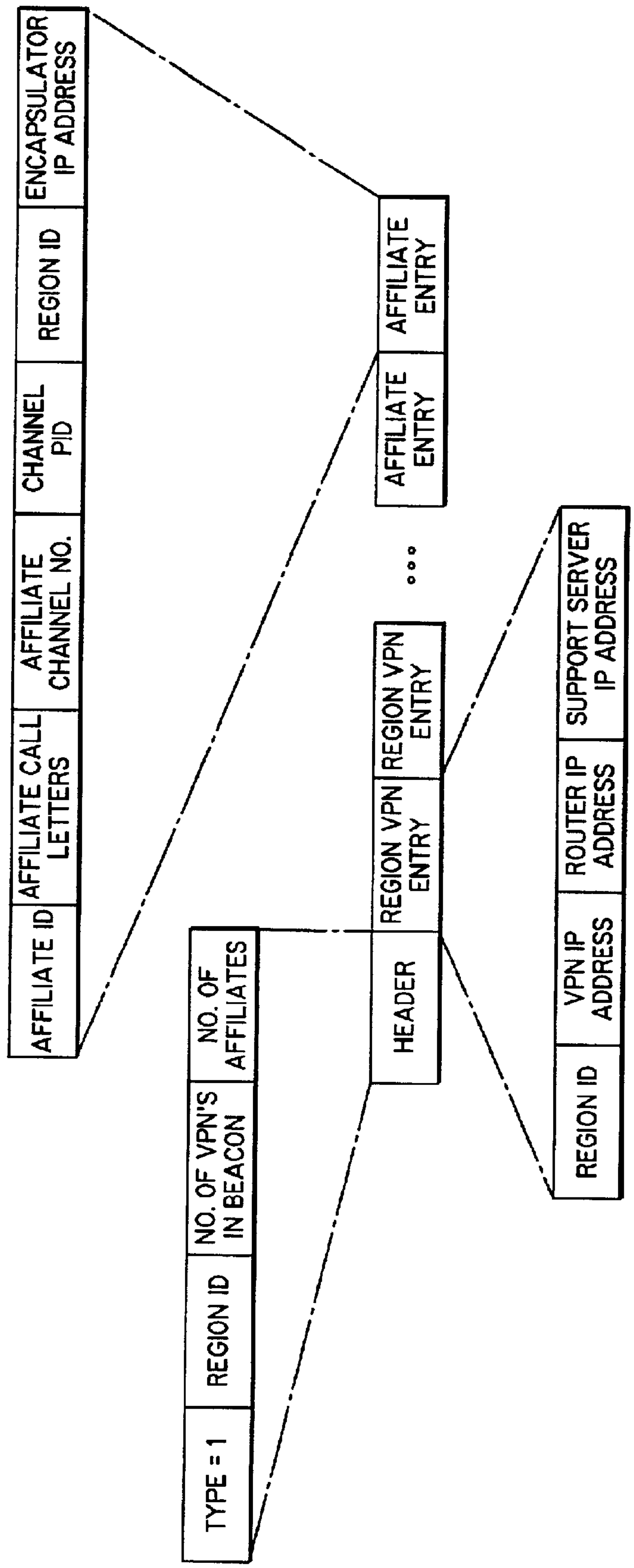
FIGS. 4B and 4C are, respectively, illustrations of region participant and affiliate loading beacons transmitted by affiliates.

In addition to providing Internet protocol information requested by clients, region control system 19 causes additional beacons to be transmitted by each affiliated transmitting station. Referring to FIG. 4B, the first beacon, known as a region participant beacon, delivers information on all regions and all affiliates in all regions that are provided in accordance with the principles of the present invention. This beacon takes the form of a packet having a header and a sequence of entries for regions and a sequence of entries for affiliates in those regions. The header for the packet includes a field identifying the packet type, followed by a region identifier for the region within which the beacon is being transmitted. Subsequently in the header, the number of regions identified by the beacon and the number of affiliates identified by the beacon are provided. This information in the header permits the remaining information to be correctly parsed and identified by client computer systems that receive the beacon.

After the header, the first section of the beacon includes a sequence of entries, one corresponding to each region and virtual private network for that region. Each entry includes the identifier of the region, the Internet protocol (IP) address for the virtual private networking server for the region, the IP address for the router for the region and the IP address for the support server for the region.

After the sequence of region entries, the beacon of FIG. 4B includes a sequence of affiliate entries, one for each affiliate for which information is provided. Each affiliate entry includes an identifier for an affiliate, as well as call letters of the affiliate, followed by the affiliate's channel number, the packet identifier PID used for Internet content transmitted by the affiliate, the region identifier for the region to which the affiliate belongs, and the IP address of the encapsulator being used by the affiliate.

It will be appreciated that the beacon illustrated in FIG. 4B includes sufficient information to assemble the complete copy of the region participant table and the region table shown in FIGS. 3A and 3B. Thus, a client upon receipt of this beacon may assemble sufficient information to identify each of the regions and each of the affiliates in each region that are providing Internet protocol content in accordance with the principles of the present invention.

Figure 4C:
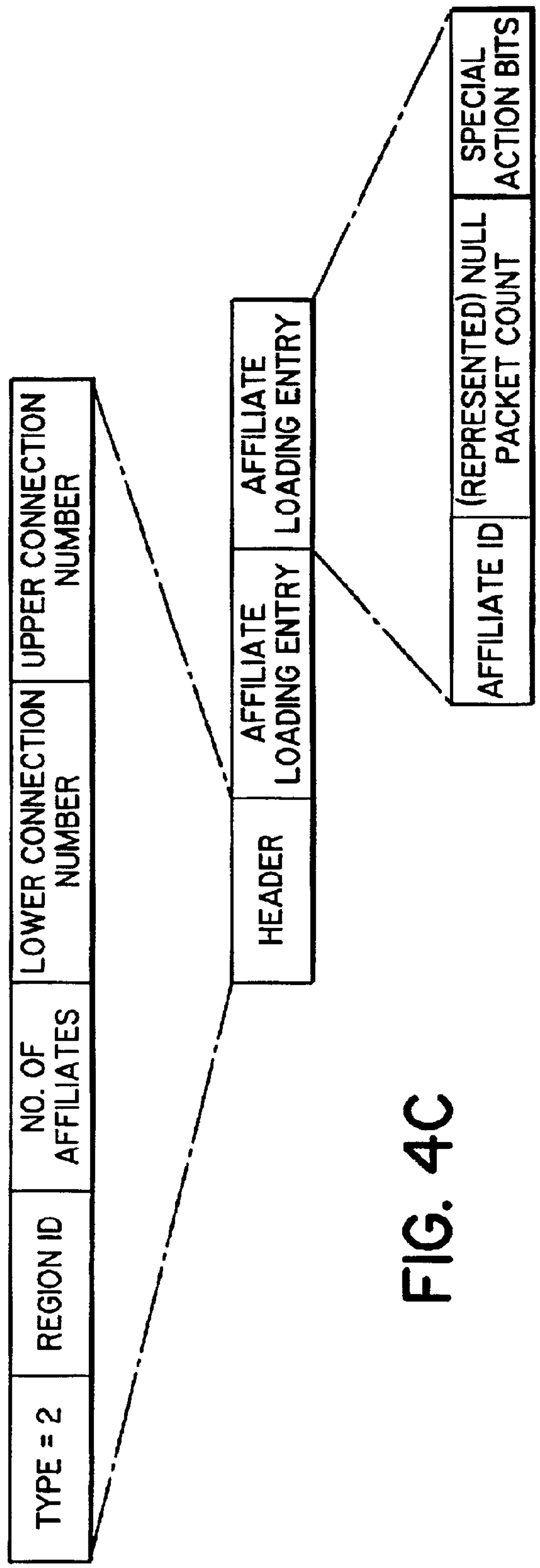

Referring now to FIG. 4C, a second beacon signal that is transmitted from each of the transmitters can be explained. This beacon signal, known as an affiliate loading beacon, provides loading information for each of the transmitting stations identified in the beacon. Affiliate loading information is provided to clients so that clients may perform a load balancing algorithm described in detail below to choose an appropriate affiliate to use in receiving Internet protocol information.

The affiliate loading beacon includes a header, and a sequence of fields, each associated with an affiliate for which loading information is provided. The header includes a type identifier identifying the beacon as an affiliate loading beacon, followed by a region identifier for the region within which the affiliate loading is being reported. Thereafter, the header identifies a number of affiliates for which loading information is being identified. Finally, the header of the affiliate loading beacon identifies a lower and an upper connection number. As is explained in more detail below, these connection numbers are used to identify a subset of the clients to whom a particular beacon is to be directed. Only those clients whose connections fit within the range of the lower and upper connection number will respond to loading information to select potentially different transmitters for receiving Internet protocol information. It will be appreciated that the range between the lower connection number and the upper connection number may be adjusted by the region control system to carefully control the number of client computer systems that are reallocating their use of transmitters between one transmitter and another. By transmitting a beacon having a connection number range that is suitably chosen, the load amongst the transmitting stations may be well balanced without creating an excessive amount of channel swapping by client computer systems.

Following the header of the affiliate loading beacon, are a number of entries each associated with an affiliate. Within these affiliate loading entries, an affiliate is identified by its ID, and the loading of the affiliate is identified through a null packet count and special action bits. The null packet count for an affiliate reflects the number of null packets that the affiliate is transmitting at the present time period. This null packet count is thus a representation of the loading of the affiliate, with higher null packet counts reflecting lower load levels of an affiliate. It will be noted that the null packets count included in the affiliate loading beacon is a "represented" null packet count. In some instances, an affiliate may wish to reserve a certain bandwidth for use in other services. In this case, the null packet count of the affiliate may represent as available, will be less than the actual null packet count being broadcast by the affiliate, so as to reserve bandwidth for other applications.

The special action bits transmitted with the affiliate loading information, may have a variety of functions for performing special processing. As one example, the special action bit may be used as a vacate bit to direct all clients receivers to vacate the use of the transmission band for Internet protocol information. The vacate bit of this kind may be used to clear bandwidths when a television broadcaster is, for example, transitioning from a standard definition broadcast to a high definition broadcast. The special action bits may also be used to designate specific broadcast types, such as virus signature updates, streaming video of interest to multiple clients, or other forms of content that may be identified as currently available from a transmitter.

Figure 5A:
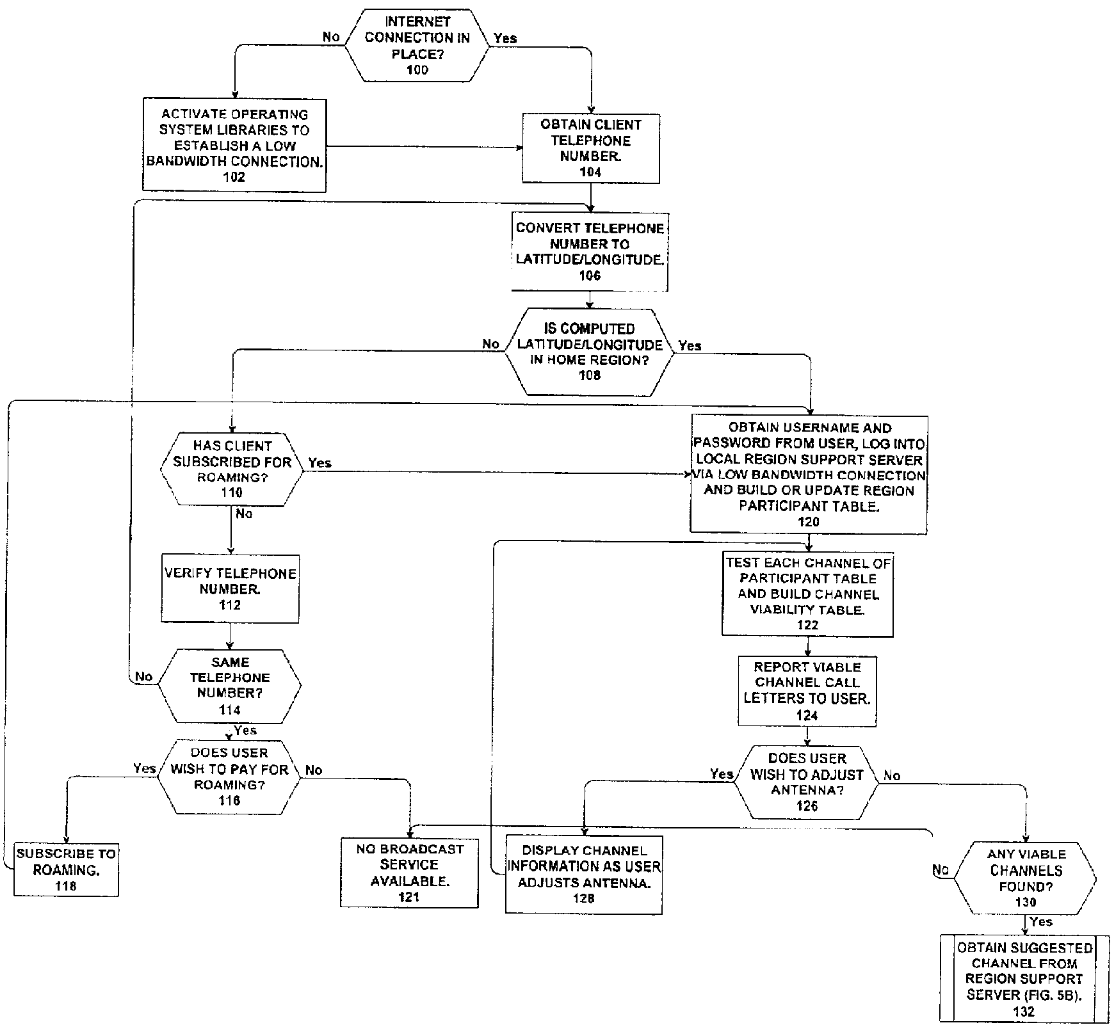
FIG. 5A is a flow chart of the sequence of events in the configuration of FIG. 2 that occurs in initiation of an Internet connection in accordance with principles of the present invention.

Referring now to FIGS. 5A through 5F, specific processes followed by the system illustrated in FIG. 2 can be more clearly understood. FIG. 5A describes the initialization of the client computer system to utilize Internet access via digital transmissions in accordance with the principles of the present invention. In a first step 100, the client computer system determines whether an Internet connection via an Internet service provider (dial up modem link) is in place. If no connection is in place, then in step 102, the operating system libraries are activated to establish a low bandwidth connection, for example, using a modem and a telephone as discussed above. After a connection to the Internet has been established, in step 104 the client's telephone number is obtained, and then used in step 106 to obtain a rough estimate of the latitude and longitude of the clients premises. This longitude and latitude estimate, is then used in step 108 to determine the client's location relative to the regions illustrated in FIG. 1.

If the longitude and latitude computed for step 108 is not within the client's home region, then in step 110 it is determined whether the client has subscribed to a roaming service. If not, then the client is prompted to verify the telephone number in step 112. If the received telephone number is the same in step 114, it is determined that the user is in fact roaming away the client's home region. In this case, in step 116 the user is asked to consent to paying a surcharge for roaming. If the user is willing to pay for roaming, then in step 118 the user is subscribed to the roaming service and processing continues. If the user is unwilling to pay for roaming in step 116, then no broadcast service is available and the user is so notified in step 121. In such a case, the client's Internet communications will all be performed via the bidirectional low bandwidth connection established, e.g., using the telephone line and Internet service provider.

If the user is authorized roaming or if the user is in his home region, processing will arrive at step 120. In step 120, the user of the client computer system is prompted for a user name and password, which are then used to login into the identified local region support server via the low bandwidth, e.g., telephone IP, connection. Communications with the region support server permit the client computer system to obtain the content of the region participant table and store this content or update previously stored content. The client computer system thereby obtains specific information regarding the location of transmitters within the locally available radio spectrum. Accordingly, in step 122, the client computer system tests each channel identified in the participant table to determine whether the channel is reliably received by the client computer system. As channels are evaluated, the client computer system constructs the channel viability table of FIG. 3C, by storing for each channel a signal strength measure as well as error rate measure. The channel PID and VPN IP address are available from the region participant table that was obtained in step 120 from the local region support server.

After step 122, a channel viability table has been constructed for each channel in the local region. In step 124, those channels that have been identified as viable, i.e., as having a sufficiently low error rate and sufficiently high signal strength, are reported to the user of the client computer system. This permits the user to assess whether the client computer system is receiving those channels that should be receivable at the client's current location. If some channels are not being effectively received, the user may wish to adjust the antenna associated with the DTV receiver card. To allow this, in step 126 the user is asked whether the user wishes to adjust the antenna. If so, then in step 128 channel information is made available to the user so that the user may view this information and adjust the DTV antenna being used by the DTV receiver card. After the user completes adjustments of the antenna, processing returns to step 122 to retest each potentially available channel and rebuild the channel viability table.

Once the user is satisfied with the channels that have been identified through the testing of step 122, processing proceeds from step 126 to step 130 in which it is determined whether any viable channels have been found for use in IP transmissions. If not, then no broadcast service is available and processing terminates at step 121. If viable channels are found in step 130, then processing continues to step 132 to obtain a suggested channel from the regional support server using the process of FIG. 5B.

Figure 5B:
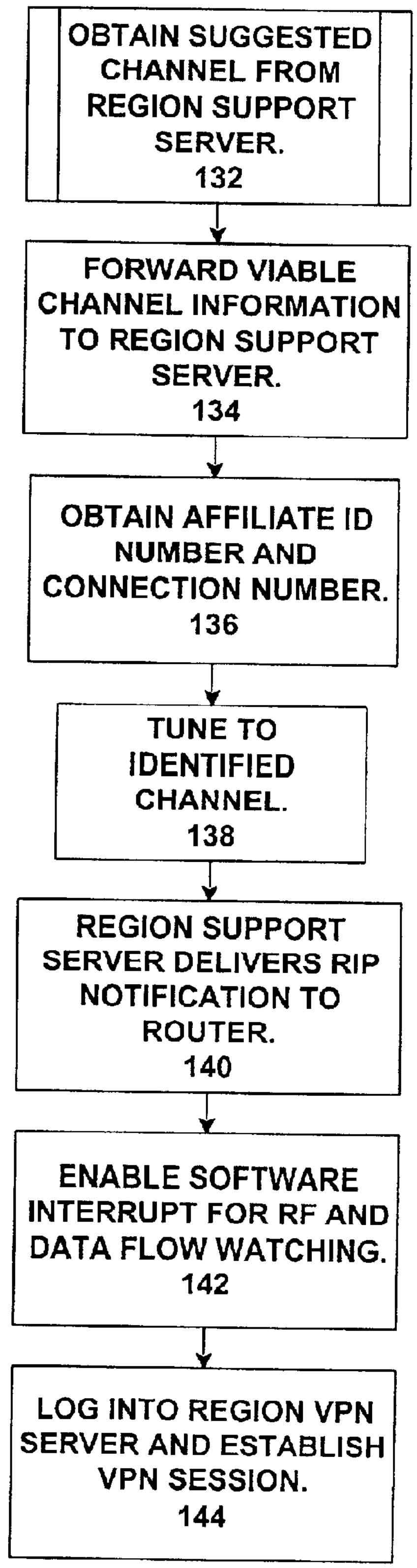
FIG. 5B is a flow chart of operations performed to obtain a suggested channel from the region support server in accordance with principles of the present invention.

Referring now to FIG. 5B, the process of obtaining a suggested channel from the region support server can be explained. In a first step 134 the viable channel information is forwarded from the client computer system to the region support server over a previously established connection. This permits the region support server to utilize viable channel information and load information, available only to the region support server when the process of FIG. 5B is performed, to identify an appropriate channel for use by the client computer system. Region support server thus determines an appropriate channel to be used by client computer system and retrieves an affiliate ID number for the selected channel and generates a connection number. As noted above, connection numbers are assigned to each client utilizing the digital broadcast system, so that load balancing activities may be directed to particular clients or ranges of clients.

The affiliate identifier and connection number are delivered, in step 136, to the client computer system. Thereafter, in step 138, client computer system causes its digital television receiver card to tune to the channel of the affiliate identified by the region support server. Thereafter in step 140, the initialization of the client connection continues, specifically, routing information is delivered to the router at the region central controller. This may be done in a variety of ways; in the illustrated example the region support server delivers a routing information packet notification to the router at the region central control. Alternatively, the client might generate a routing information packet and deliver the packet to the router. Regardless of how it is generated, the routing information packet causes the router to update its routing table so that packets directed to the client computer system are directed to the appropriate one of the digital broadcast transmitters for the local region. Within the client, in step 142, a software interrupt is enabled, to watch the data flow so as to identify failures of the RF transmission and take an appropriate action as detailed below with reference to FIG. 5F.

After these initializations are completed, the client computer system then logs into the region virtual private networking server to establish a virtual private network which may be then later used in obtaining Internet content through the process described with reference to FIG. 5C.

Figure 5C:
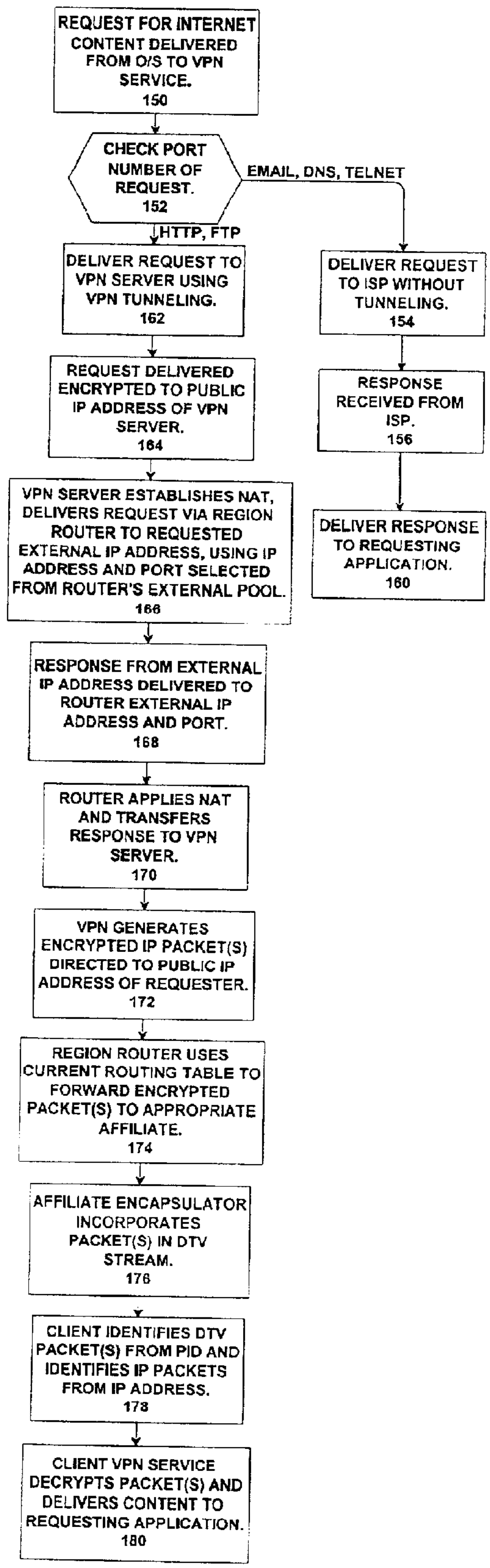
FIG. 5C is a flow chart of the sequence of events in the configuration of FIG. 2 that occurs during use of an Internet connection in accordance with principles of the present invention.
Figure 5D:
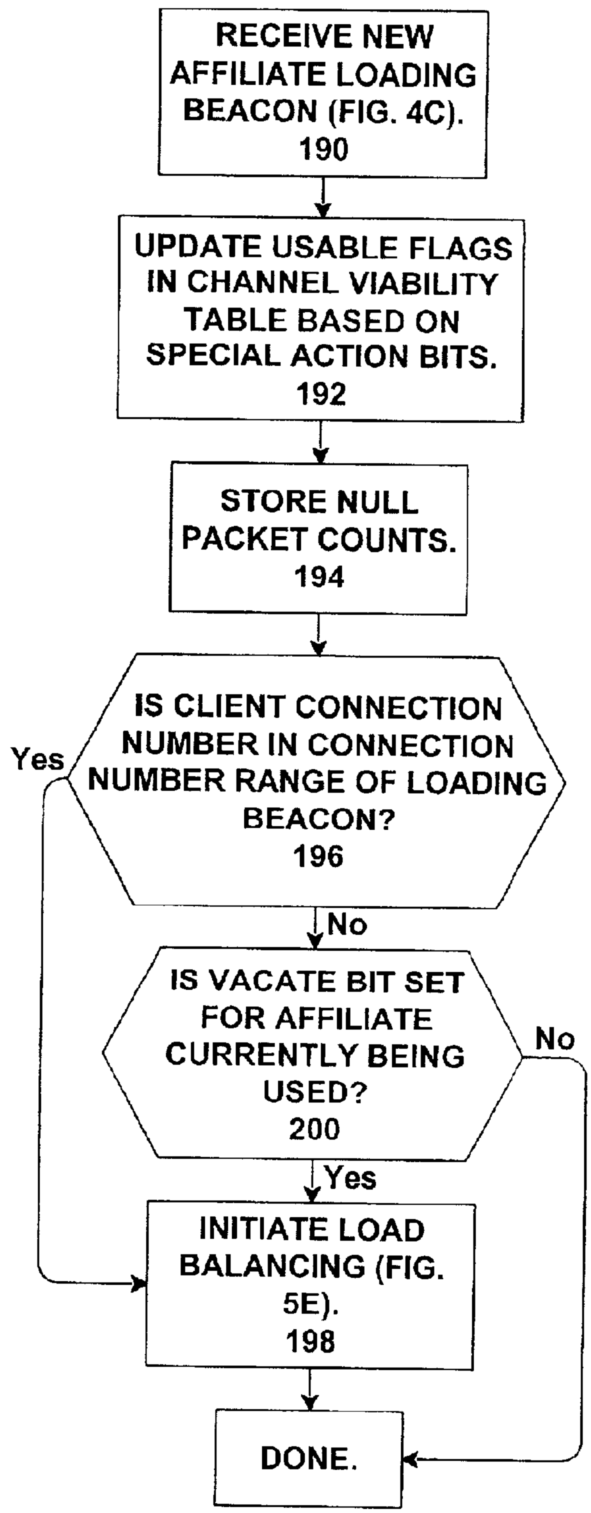
FIG. 5D is a flow chart of the sequence of events in the configuration of FIG. 2 that occurs in response to an affiliate loading beacon.

Referring now to FIG. 5C, the interaction of the client computer system and region central controller for providing Internet access to the client, can be described in further detail. The process of obtaining Internet access at a client begins when a request for Internet content is delivered from an application on the client computer system, through the operating system of the client computer system, to the virtual private networking service active on the client computer system. In a first step of processing this request, step 152, the request is evaluated to determine the port number to which the request is directed. Certain kinds of requests, identifiable by their port number, do not utilize the broadcast Internet access provided through the DTV transmission towers in accordance with the principles of the present invention. Specifically, email, domain name service (DNS) requests, and telnet transactions, as identified by the ports to which they are directed, are examples of types of access that are not processed through the virtual private network connecting the client computer system to the region central controller.

For email, DNS, telnet and other disqualified transactions, processing proceeds to step 154 in which the request is delivered to the client Internet service provider without tunneling. A response is then received directly from the Internet service provider as is done in normal dial up Internet access using the Internet service provider. The received response in step 160 is then delivered to the requesting application.

Those forms of Internet access that do utilize the digital broadcast system of the present invention proceed from step 152 to step 162. Requests that use the digital broadcast system may be FTP or HTTP requests or others. These requests are delivered to the virtual private networking server for the local region, using VPN tunneling in accordance with known virtual private networking standards. When the request is delivered to the virtual private networking server, it is delivered in the form of encrypted packets addressed to the public IP address of the virtual private networking server (step 164). In step 166, the virtual private networking server establishes a network address translation so that it may deliver the received request via the region router to the requested external address of a third party server from which Internet content is requested. The request is delivered to the third party server using the Internet protocol address and port that are selected for the network address translation from the routee's external pool of addresses and ports.

In step 168, responding to step 166, the external server ultimately responds to the request from the VPN server. This response comes in the form of one or more packets identified as from the desired external IP address and delivered to the routers external IP address and port that were selected from the routers external pool for network address translation. In step 170, the router applies network address translation to transfer the received response to the virtual private networking server. Thereafter, in step 172, the virtual private networking server generates an encrypted Internet protocol packet or packets, directed to the public Internet protocol address of the requesting client and identifying the VPN server as the packet source. In step 174, these encrypted Internet protocol packets are delivered to the region router which uses its current routing table to select one of the affiliates and forward the encrypted Internet protocol packets to that affiliate.

It will be appreciated that the routing table in the router at the central control system is updated with routing information packets each time a client "changes the channel", i.e., selects a different DTV transmitter from which to receive Internet content transmissions. Therefore, the routing table will always accurately reflect the appropriate transmitter to which client requested content should be forwarded. In step 176, the packets forwarded by the region router are incorporated into the digital television stream in the manner discussed above with reference to FIG. 4A.

Thereafter, in step 178, the client will identify the digital television packets containing Internet content from their packet identifier and will further identify Internet protocol packets directed to the clients computer from the Internet protocol address included in those packets.

In step 180, the clients virtual private networking service, upon receiving the content from the digital television receiver card, will decrypt the packet(s) and deliver the content thereof to the requesting application. It will be appreciated that the speed at which content may be delivered to the client computer system via direct digital transmission can be substantially faster than is available from dial up telephone connections for the reason that all digital connections in the path of the returning Internet content are high speed connections.

As noted above, the client computer system establishes a software interrupt upon initializing for reception of Internet content. This software interrupt is activated each time a new affiliate loading beacon such as illustrated in FIG. 4C, is received by the digital television receiver card of the client computer system. After receiving such a beacon in step 190, in step 192 the beacon is evaluated to update the usability flags in the channel viability table of FIG. 3C, based upon the special action bits of the affiliate loading beacon. Thus, for example, if the affiliate loading beacon includes special action bits requesting all client computer systems for vacate an affiliate channel, this data will be used to update the usability flags stored at the client computer systems so that client computer systems will no longer select those channels for use. In step 194, the null packet counts provided in the affiliate beacon are also stored by the client computer system to be used in later evaluation of the load of affiliates, if and when it is necessary to "change the channel" to another DTV transmitter from which the client can receive digital transmissions. After storing this data, in step 196 the client computer system determines whether the client's connection number falls within the connection number range of the affiliate loading beacon. If so, then in step 198 the load balancing procedure of the client computer system is initiated, as described further below with reference to FIG. 5E. If the client computer systems connection number is not in the connection number range of the loading beacon, processing continues from step 196 to step 200 in which the client computer system determines whether the vacate bit in the affiliate loading beacon is set, for the affiliate currently being used by the client computer system. If so, the client computer systems must immediately select a new channel for use in receiving digital transmission of Internet content. (Clients unable to receive any other transmission, may be allowed to remain on a channel at the discretion of the affiliate or control system.) Accordingly, in this case, processing begins again to step 198 to initiate load balancing. After load balancing, or if neither of the conditions of step 196 or step 200 are met, the processing of the affiliate loading beacon is completed.

Figure 5E:
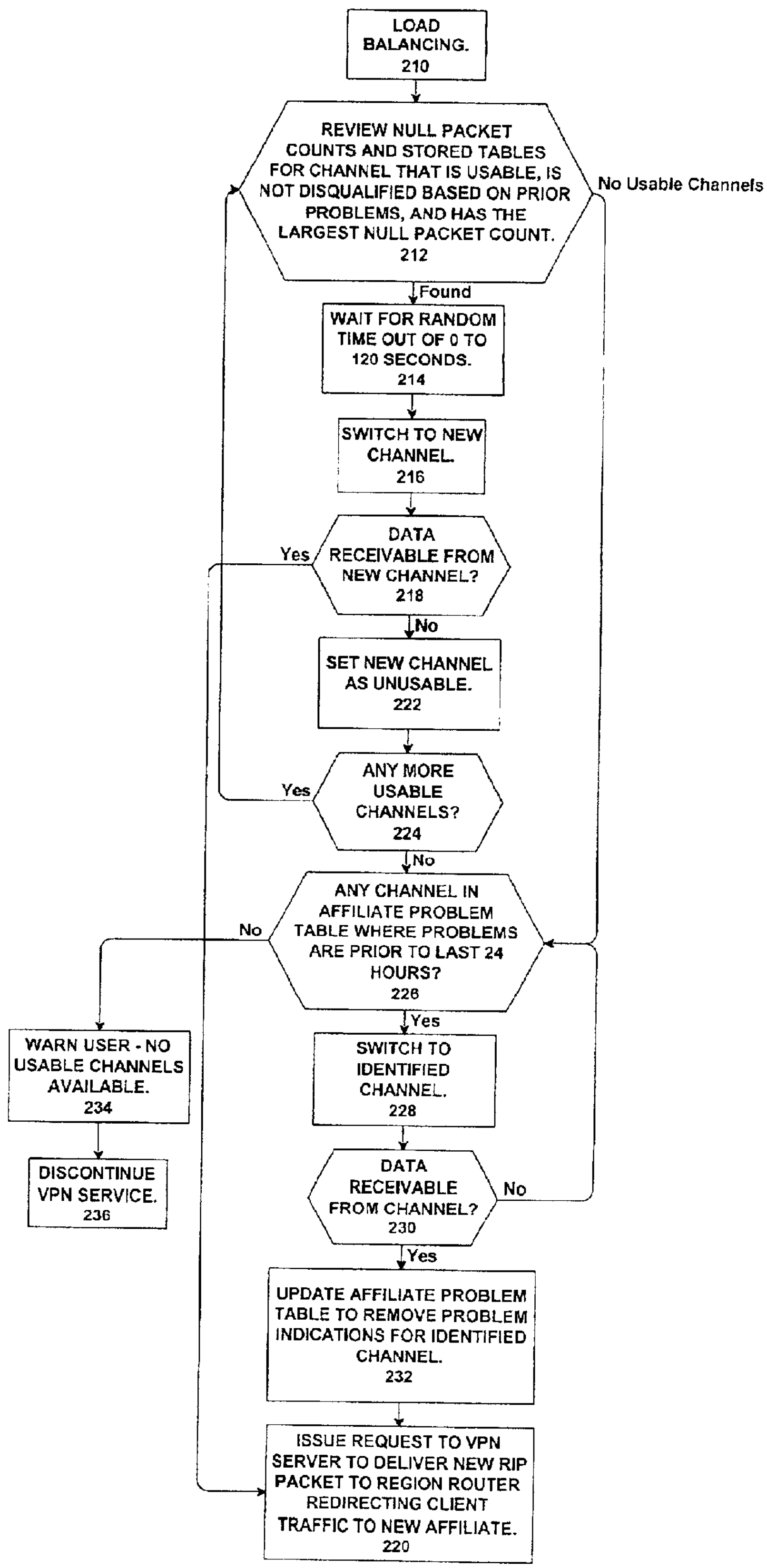
FIG. 5E is a flow chart of the sequence of events in the configuration of FIG. 2 that provides load balancing or provisioning between digital broadcast signals.

Referring now to FIG. 5E, the process for load balancing performed by a client computer system can be elaborated. After load balancing is initiated (step 210), in step 212 the null packet counts most recently received in an affiliate loading beacon are reviewed, as well as the stored affiliate usability information, to determine which channel is available for use. This process involves searching for a channel that is not only usable and no disqualified from use based upon prior problems, but also has the largest null packet count, as previously identified in an affiliate loading beacon. When a candidate channel is found, processing proceeds to step 214 in which the client computer system waits for a random timeout period of between 0–120 seconds. This timeout period insures that client computer systems will not all simultaneously change channels and thus radically change the loading being established by the region control center. At the end of this timeout period, in step 216, the client computer system switches to the selected new channel, by providing an appropriate instruction to the digital television receiver card. Next, in step 218 it is determined whether data is receivable from the newly selected channel. If so, then processing continues to step 220 in which a new routing information packet is delivered to the regional router, as described above, so as to redirect all traffic for the client computer system to the new affiliate that has been selected by the client.

If the newly selected channel is not producing receivable data in step 218, then in step 222, the newly selected channel is designated as unusable in the affiliate viability table stored by the client computer system. Thereafter in step 224 client computer system determines whether there are any other usable channels identified in the viability table. If so, processing returns to step 212 to evaluate those other channels.

If there are no usable channels in step 224 or if there are no usable channels in step 212, processing arrives at step 226. In step 226, the channels identified in the viability table and affiliate problem table are accessed to identify which of those channels have had problems prior to the most recent 24 hours. This step is taken so that channels which have had previous difficulties, and thus have been designated as unusable, are not permanently identified as unusable but can be reevaluated after a 24-hour period.

If there is a channel in the affiliate problem table having problems that are not from the most recent 24 hours, then in step 228 the client computer system switches to the channel. In step 230, the client computer system determines whether data can be received from the selected channel. If so, then in step 232, the affiliate problem table is updated to remove the problem indications, selected channel is identified as usable, and processing continues to step 220 to issue a request of the virtual private networking server to redirect traffic to the newly selected affiliate.

If in step 230 data is not found to be receivable from a channel, then that channel is marked as having problems at the current time in the affiliate problem table and processing returns to step 226 to attempt to identify another channel which may be evaluated to determine whether previous problems have been resolved. If no channels have been successfully identified in step 226, ultimately processing will proceed to step 234 to which the user the warned that there are no usable channels available at the present time. (As noted above, clients only able to receive one channel may be permitted to use that channel even if the vacate bit for the channel is set.) If no service is available, in step 236 the virtual private networking service will be discontinued so that all Internet access proceeds through the low speed (dial up) connection that was established previously.

Figure 5F:
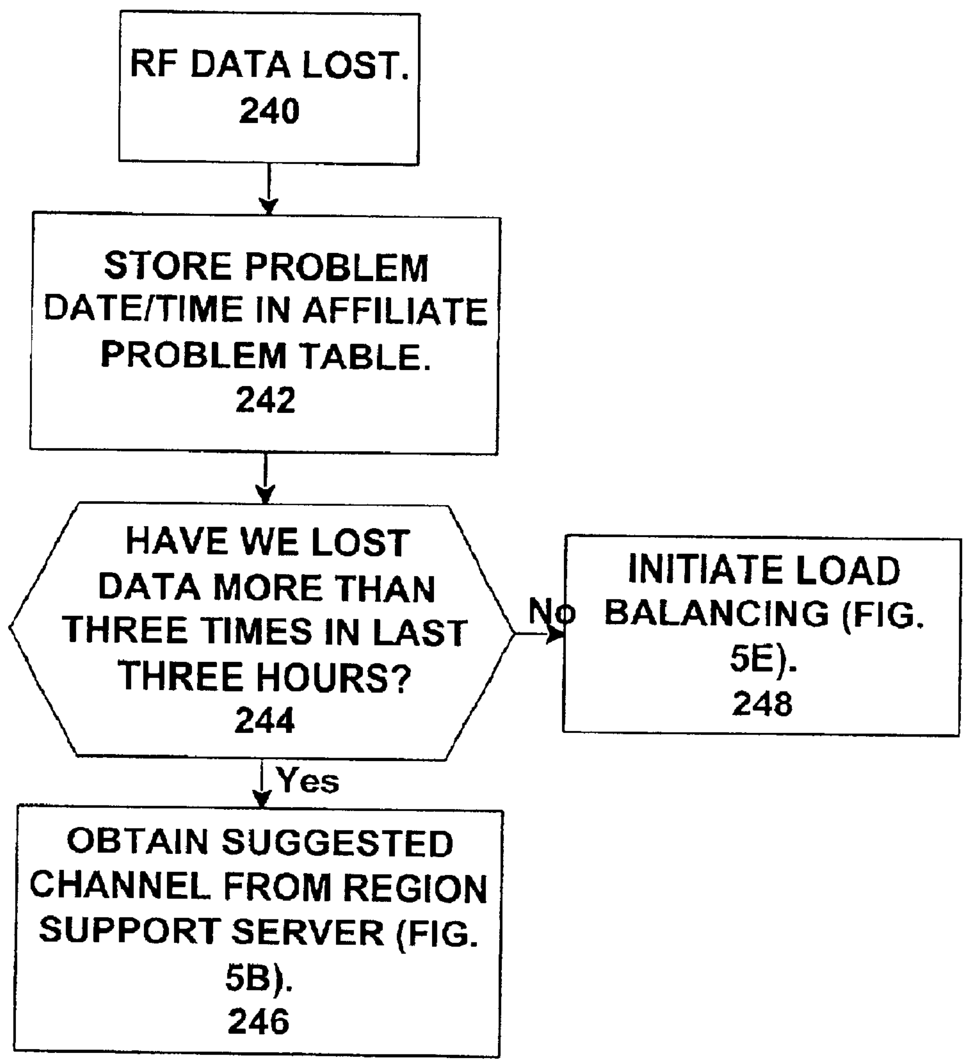
FIG. 5F is a flow chart of steps taken upon loss of RF data by the client during operation of the system of FIG. 2.

Referring now to FIG. 5F, as noted above, a software interrupt is established during initialization of the client. This interrupt monitors the received RF data stream, so that loss of the RF data transmission from the digital television station can be immediately identified. When this occurs in step 240, immediately in step 242 the date and time in which the problem occurred is stored in the affiliate problem table, associated with the current affiliate station. Thereafter in step 244, it is evaluated whether the RF data stream has been connected preceding three hours. This is an attempt to measure whether the problems are recurring or relatively infrequent. In step 246, if data has been lost more than three times in the last three hours, then processing proceeds to FIG. 5B to obtain a new suggested channel from the region support server. The region support server is enlisted to suggest a new channel for the reason that the recurring recent problems may have caused the client computer system to fail to receive a channel loading beacon, and so may lack the data needed to select an appropriate channel. If data has not been lost more than three times in the last three hours, then the difficulties with the current channel are not particularly chronic. In this case, load balancing is initiated in step 248 by proceeding directly to FIG. 5E to select a channel which can be used for further Internet access.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for balancing a transmission load among a plurality of broadcast origination points in a digital broadcast transmission system for wireless delivery of digital content to a plurality of client computer systems, comprising:

providing a host computer system that is in communication with the digital broadcast transmission system;

establishing a communication connection between the host computer system and one of the client computer systems;

receiving a request for content from said one of the plurality of client computer systems;

obtaining the requested content;

selecting one of the plurality of broadcast origination points;

transferring the requested content from the host computer system to the selected one of the plurality of broadcast origination points;

causing a digital broadcast to be transmitted by the selected one of the plurality of broadcast origination points to said one of the plurality of client computer systems, said digital broadcast including at least the requested content;

including a vacate instruction in said digital broadcast that instructs one or more of the client computer systems to stop listening to one of the plurality of broadcast origination points and to identify a different one of the plurality of broadcast origination points to start listening to; and receiving a routing information update from one of the client computer systems, said routing information update requesting future digital broadcasts from the identified different one of the plurality of broadcast origination points.

2. The method of claim 1 further comprising:

updating a routing information record to ensure future digital broadcasts to said one of the client computer systems are made via the identified different one of the plurality of broadcast origination points.

3. A method for balancing a transmission load among a plurality of broadcast origination points in a digital broadcast transmission system for wireless delivery of digital content to a plurality of client computer systems, comprising:

providing a host computer system that is in communication with the digital broadcast transmission system;

establishing a communication connection between the host computer system and one of the client computer systems;

receiving a request for content from said one of the plurality of client computer systems;

obtaining the requested content;

selecting one of the plurality of broadcast origination points;

transferring the requested content from the host computer system to the selected one of the plurality of broadcast origination points;

causing a digital broadcast to be transmitted by the selected one of the plurality of broadcast origination points to said one of the plurality of client computer systems, said digital broadcast including at least the requested content;

wherein said digital broadcast further comprises a beacon signal that provides transmission characteristics for one or more of the broadcast origination points; and wherein said characteristics comprise bandwidth availability data for one or more of the digital broadcast origination points.

4. The method of claim 3 further comprising:

including a reported null packet count for one or more of said broadcast origination points in said bandwidth availability data; and receiving a routing information update from one of the client computer systems, said routing information update requesting future digital broadcasts from one of the plurality of broadcast origination points having a higher reported null packet count than the selected one of the broadcast origination points.

5. The method of claim 4 further comprising:

updating a routing information record to ensure future digital broadcasts to said one of the client computer systems are made via the broadcast origination point having a higher reported null packet count than the selected one of the broadcast origination points.

6. The method of claim 3 wherein:

said beacon signal is encoded such that the beacon signal is intended to be read by only a subset of the client computer systems.

7. The method of claim 6 wherein:

the beacon signal is addressed for a subset of the plurality of client computer systems, at least one of which in the subset is positioned to receive transmissions from two or more broadcast origination points.

8. The method of claim 3, wherein:

said beacon signal includes a suggested broadcast origination point for at least one of the client computer systems.

9. A method for selecting a broadcast origination point in a digital broadcast transmission system for wireless delivery of digital content to a client computer system, said digital broadcast system comprising a host computer system and a plurality of broadcast origination points, the method comprising:

establishing a communication connection between said client computer system and said host computer system;

transmitting a request for content to said host computer system;

providing the client computer system with a digital broadcast receiver;

receiving a digital broadcast transmitted by a selected one of the plurality of broadcast origination points at the digital broadcast receiver, said digital broadcast including at least the requested content; and receiving a beacon signal from one of the plurality of broadcast originating points at the digital broadcast receiver, said beacon signal providing transmission characteristics of said plurality of broadcast origination, wherein said characteristics comprise bandwidth availability data for one or more of the digital broadcast origination points.

10. The method of claim 9 wherein:

said requested content is received from the Internet by the host computer system and forwarded to the selected one of said plurality of broadcast origination points.

11. The method of claim 9 further comprising:

receiving at least one special action instruction in said digital broadcast;

said at least one special action instruction comprising a vacate instruction that instructs one or more of the client computer systems to stop listening to one of the plurality of broadcast origination points and to identify a different one of the plurality of broadcast origination points to start listening to;

updating a routing information record to ensure future digital broadcasts to said one of the client computer systems are made via the identified broadcast origination point.

12. The method of claim 11 wherein:

said host computer system comprises a server and a router; and said step of updating a routing information record comprises transmitting a routing information update to a selected one of the server and the router.

13. The method of claim 9 further comprising:

receiving bandwidth availability data for one or more of said digital broadcast origination points in said characteristics;

generating a routing information update, said routing information update requesting future digital broadcasts from an identified one of the plurality of broadcast origination points, the identity of which is selected based on the bandwidth availability data; and transmitting the routing information update to the host computer system to update a routing information record to ensure future digital broadcasts to said one of the client computer systems are made via the identified broadcast origination point.

14. The method of claim 13 wherein:

said bandwidth availability data includes a reported null packet count for one or more of said broadcast origination points.

15. The method of claim 13 wherein:

said beacon signal is addressed to a subset of a client computer systems to limit the number of client computer systems that may change broadcast origination points at a given time.

16. The method of claim 9 further comprising:

receiving at least one of error information and signal strength information for one or more of the digital broadcast origination points in said characteristics, adjusting the digital broadcast receiver to receive a digital transmission from one or more of the plurality of digital broadcast origination points;

determining whether digital broadcast signals are being received at said digital broadcast receiver from a digital broadcast origination point for which at least one of (1) the received error information is below a first predetermined threshold and (2) the received signal strength information is above a second predetermined threshold; and prompting a user of said client computer system to adjust a digital receiver antenna if digital broadcast signals are not being received from one or more digital broadcast origination points for which at least one of (1) the received error information is below a first predetermined threshold and (2) the received signal strength information is above a second predetermined threshold.

17. The method of claim 16 wherein:

said at least one of received error information and received signal strength information is collected by one or more client computer systems and transmitted to said host computer system for transmission to others of the plurality of client computer systems.

18. The method of claim 14 wherein:

said beacon signal includes a suggested broadcast origination point for at least one of said client computer systems to enable said at least one client computer system to select a new broadcast origination point without receiving a beacon signal from said selected one of the plurality of broadcast origination points.

19. A method for provisioning bandwidth to dynamically and automatically equalize transmission loads among a plurality of broadcast origination points in a digital broadcast transmission system for wireless delivery of digital content from a host computer system to a plurality of client computer systems, comprising:

receiving content requested by at least one of the client computer systems;

transmitting a first digital broadcast transmission from a selected one of the plurality of broadcast origination points to at least one of the client computer systems, the digital broadcast including at least the requested content;

receiving transmission information about one or more of the plurality of broadcast origination points; and transmitting a second digital broadcast transmission from the selected broadcast origination point to one or more of the client computer systems, the second digital broadcast transmission including a beacon signal that provides transmission information about one or more of the plurality of broadcast origination points to permit a client computer system to select a broadcast origination point, whereby transmission loads are dynamically and automatically equalized among said plurality of broadcast origination points.

20. The method of claim 19 wherein:

said requested content is received from the Internet; and said transmission information comprises a reported null packet count for one or more of said broadcast origination points, said reported null packet count reflecting information about a broadcast capacity of a broadcast origination point.

21. The method of claim 19 further comprising:

transmitting a third digital broadcast transmission comprising at least one special action instruction, said at least one special action instruction comprising a vacate instruction that instructs one or more of the client computer systems to stop listening to one of the plurality of broadcast origination points and to identify a different one of the plurality of broadcast origination points to start listening to.

22. The method of claim 19 further comprising:

addressing said beacon signal such that the beacon signal is intended to be read by only a subset of the client computers.

23. The method of claim 19, further comprising:

receiving from said host computer system a suggested broadcast origination point for one or more of the client computer systems; and transmitting said suggested broadcast origination point to said one or more of the client computer systems, whereby the host computer can direct the provisioning of the plurality of broadcast origination points, and whereby one or more client computer systems can select a new broadcast origination point without receiving a beacon signal from said selected one of the plurality of broadcast origination points.

24. A method for providing Internet access to a client computer system, comprising:

providing a digital broadcast transmission system for wireless delivery of digital content to said client computer system, said digital broadcast transmission system including at least first and second broadcast origination points;

providing a host computer system connected to said digital broadcast transmission system;

establishing a communication connection between said host computer system and said client computer system;

delivering a request for content from said client computer system to said host computer system;

obtaining delivery of requested content via the Internet to said host computer system;

transferring said requested content to a selected one of said first and second broadcast origination points; and receiving a digital broadcast transmission at said client computer system from said first or second broadcast origination point, said digital broadcast including said requested content;

wherein said digital broadcast transmission includes a beacon signal that provides transmission characteristics of said digital broadcast origination, wherein said characteristics comprise bandwidth availability data for one or more of the digital broadcast origination points.

* * * * *